No. 866,472. PATENTED SEPT. 17, 1907.
J. B. JONES.
FEEDING AND WATERING DEVICE FOR POULTRY AND ANIMALS.
APPLICATION FILED APR. 23, 1907.
2 SHEETS—SHEET 1.
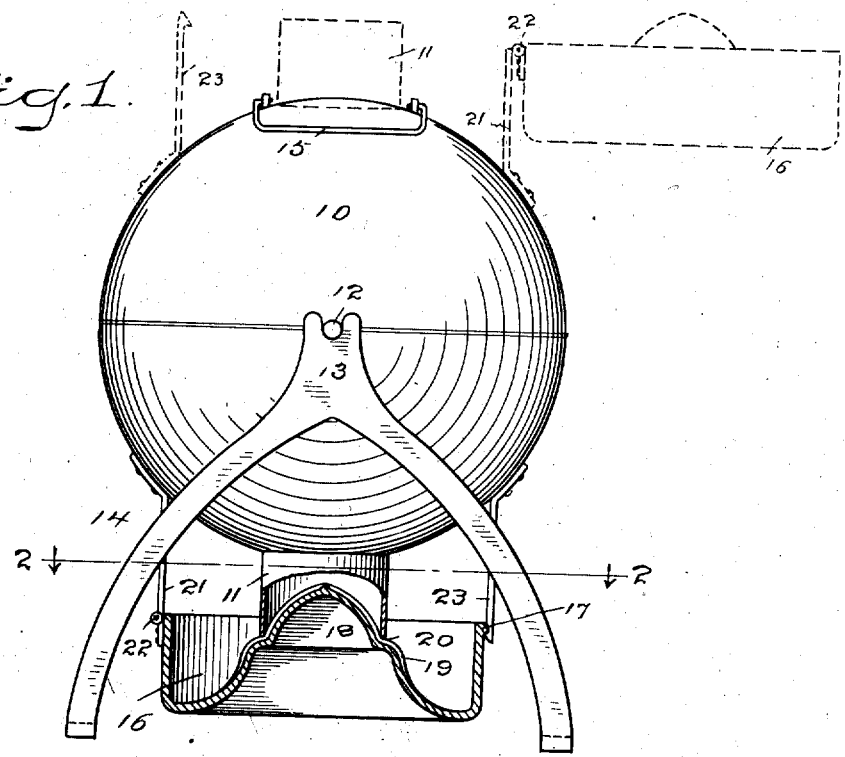
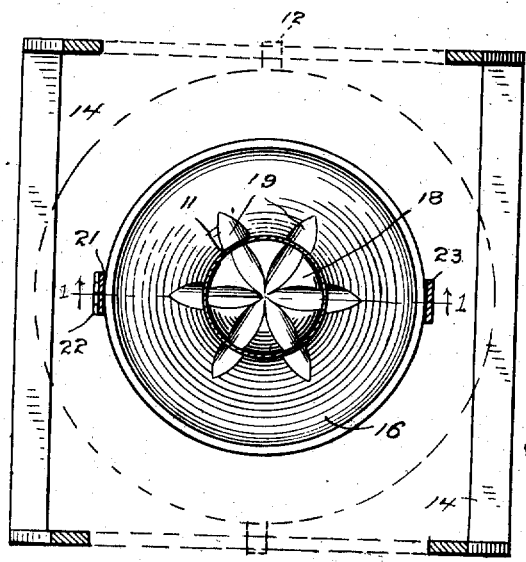
WITNESSES
H. A. Lamb.
S. W. Atherton
INVENTOR
John B. Jones
BY
A. M. Wooster
ATTORNEY No. 866,472. PATENTED SEPT. 17, 1907.
J. B. JONES.
FEEDING AND WATERING DEVICE FOR POULTRY AND ANIMALS.
APPLICATION FILED APR. 23, 1907.
2 SHEETS—SHEET 2.
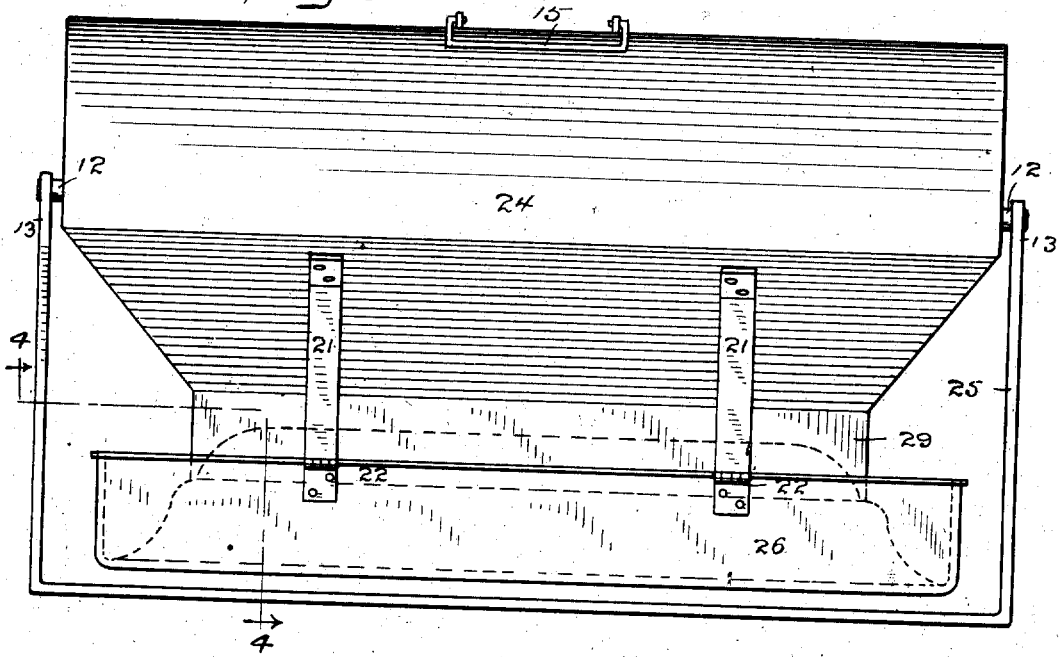
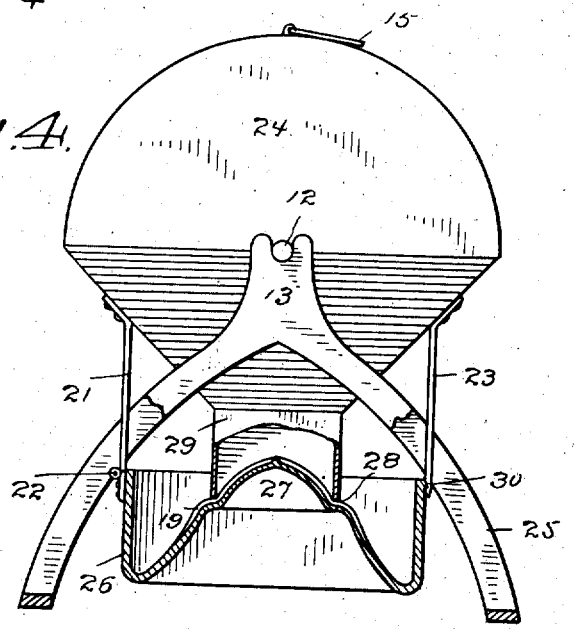
WITNESSES
H. A. Lamb.
S. W. Atherton.
INVENTOR
John B. Jones
BY
A. M. Wooster
ATTORNEY

UNITED STATES PATENT OFFICE.

JOHN B. JONES, OF BRIDGEPORT, CONNECTICUT.

FEEDING AND WATERING DEVICE FOR POULTRY AND ANIMALS.

No. 866,472.  Specification of Letters Patent.  Patented Sept. 17, 1907.

Application filed April 23, 1907. Serial No. 369,878.

*To all whom it may concern:*

Be it known that I, JOHN B. JONES, a citizen of the United States, residing at Bridgeport, county of Fairfield, State of Connecticut, have invented a new and useful Feeding and Watering Device for Poultry and Animals, of which the following is a specification.

This invention has for its object to provide a simple and inexpensive device adapted for either feeding or watering poultry and small animals, which shall be so constructed as to insure relative cleanliness; which will allow but a small portion of the feed or water to be exposed, will be automatically self-supplying as the feed or water is used and which may be easily and conveniently replenished.

With these ends in view I have devised the novel feeding and watering device, of which the following description in connection with the accompanying drawings is a specification, reference characters being used to indicate the several parts:

Figure 1 is an elevation of my novel feeding and watering device partly in vertical section on the line 1—1 in Fig. 2, and shown as supported in a frame; Fig. 2 a section on the line 2—2 in Fig. 1, looking down; Fig. 3 an elevation illustrating a variant form of the invention; and Fig. 4 is an end elevation partly in vertical section, on the line 4—4 in Fig. 3.

In the form illustrated in Figs. 1 and 2, 10 denotes the reservoir which is globular and is provided with a discharge nozzle 11 and with trunnions 12 which engage bearings 13 in a frame 14 which may be of any ordinary or preferred construction. At the top of the reservoir I provide a swinging handle 15 for convenience in manipulation.

16 denotes the trough which may be made of metal or of any suitable material and is shown as provided with a flange 17. The trough is circular and is provided with a central dome indicated by 18. The dome is provided with feeding grooves 19 and preferably with a shoulder 20 which lies below the top of the flange and is engaged by the lower end of the discharge nozzle of the reservoir, thus forming a seal for either feed or water. The central portion of the dome projects upward into the nozzle which is made relatively large so as to insure the free passage of either feed or water through the feeding grooves and down into the trough.

It is an important feature of the invention that the trough is of much less diameter than the reservoir so that the reservoir overhangs the trough and forms an effective cover and protection therefor, as it largely prevents flying dust from settling in the trough and, what is most important, prevents poultry and small animals from getting into the trough and fouling it. As shown, the trough does not rest upon the ground but is suspended from the reservoir, being attached thereto in any convenient manner. In the present instance I have shown the reservoir as provided with a depending bracket 21 to which the trough is hinged as at 22.

On the opposite side of the reservoir from the bracket is a spring catch 23 which is adapted to engage the flange of the trough and retain it in place with the lower end of the discharge nozzle in engagement with the shoulder of the dome, as clearly shown in Fig. 1.

For the purpose of replenishing, the reservoir is swung to an inverted position without removal from the frame. The spring catch is then disengaged from the flange and the trough and dome are swung over backward, as indicated by dotted lines in Fig. 1, thus permitting the reservoir to be replenished by pouring feed or water in through the nozzle. After replenishing, the reservoir and dome are swung back to place and locked there by engagement of the spring catch with the flange of the trough, after which the reservoir is given a half turn on the frame to its operative position, as in full lines in Fig. 1. The instant the reservoir and trough have reached their normal position, as in Fig. 1, sufficient of the contents will pass outward through the feeding grooves for the purposes of use and the feed or water will be replenished from the reservoir as fast as used.

When used as a watering device, the water will fill the trough up to the level of the point of engagement of the discharge nozzle of the reservoir with the dome. When the water rises to this height it will be sealed against further escape except as it is used. As the flange of the trough rises above the seal there will be no waste of water.

In the form illustrated in Figs. 3 and 4, the principle is the same but the reservoir, discharge nozzle, trough and dome are elongated instead of circular in form. Both the ends and sides of the reservoir overhang the trough as before, thus providing an effective protection therefor. 24 denotes the reservoir which is provided with trunnions 12 engaging bearings 13 in a frame 25, substantially as in the other form. 26 denotes the trough which is rectangular in form and is provided with an elongated dome 27 having feeding grooves 19, as before. The shoulder 28 extends longitudinally of the dome on both sides and across the end and is engaged by a rectangular discharge nozzle on the under side of the reservoir, substantially as before. In this form I preferably provide two brackets 21 on the under side of the reservoir on one side to which the trough is hinged, as at 22, and on the opposite side I provide two spring catches 23 which engage a flange 30 which surrounds the edge of the reservoir. The operation is precisely the same as before: To replenish the reservoir, the operator swings it to an inverted position, detaches the spring catches from the trough, swings the latter over backward, replenishes the reservoir, swings the trough back to place and locks it there by means of the catches, with the lower edge of the discharge nozzle of the reservoir in engagement with the dome, and then swings the reservoir back to place, as in the drawings.

It should be understood that the frame is not an essential feature of the invention and is preferably dispensed with in the smaller sizes of the device. When the frame is not used the trough rests upon the ground or floor and the reservoir is retained in position by the engagement of the lower end of the discharge nozzle with the shoulder on the dome. The bracket and spring catch may or may not be used, as preferred, but are not necessary as the reservoir will remain in place under ordinary conditions without retaining means. The reservoir is replenished by simply inverting it and removing the trough.

Having thus described my invention I claim:

1. A device of the character described, comprising a reservoir having a discharge nozzle, a trough having a dome provided with feeding grooves, said dome being engaged by the discharge nozzle, and positive connections between the reservoir and the trough, a portion of said connections being formed to permit relative movement of the connected parts to enable the reservoir to be filled.

2. A device of the character described, comprising a suspended reservoir having a discharge nozzle, a trough having a dome, provided with feeding grooves, which is engaged by the discharge nozzle, and means for connecting the trough to the reservoir.

3. A device of the character described, comprising a suspended reservoir having a discharge nozzle, a trough having a central dome provided with feeding grooves and a shoulder which is engaged by the edge of the discharge nozzle and means for movably connecting the trough to the reservoir.

4. A device of the character described, comprising a frame having bearings, a reservoir having trunnions engaging the bearings and a discharge nozzle, a trough having a central dome provided with feeding grooves and a shoulder which is engaged by the nozzle and means for movably connecting the trough to the reservoir.

5. A device of the character described, comprising a suspended trough having a dome provided with feeding grooves, a reservoir of greater diameter than the trough so as to overhang the trough, for the purpose set forth, and provided with a discharge nozzle engaging the dome, and means for movably connecting the trough to the reservoir.

6. A device of the character described, comprising a suspended reservoir having a discharge nozzle, a depending bracket and a spring catch, a trough hinged to the bracket and provided with a central dome having feeding grooves and a flange which is engaged by the catch to retain the parts in operative position.

7. A device of the character described, comprising a suspended globular reservoir having a discharge nozzle, a circular trough of less diameter than the reservoir and having a dome provided with feeding grooves, said dome being engaged by the discharge nozzle, and means for connecting the trough to the reservoir.

In testimony whereof I affix my signature, in presence of two witnesses.

JOHN B. JONES.

Witnesses:
A. M. WOOSTER,
S. W. ATHERTON.